United States Patent
Sugimoto et al.

(10) Patent No.: US 7,400,105 B2
(45) Date of Patent: Jul. 15, 2008

(54) MOTOR DRIVE DEVICE AND IMAGE-FORMING DEVICE INCLUDING THE SAME

(75) Inventors: Tasuku Sugimoto, Nagoya (JP); Hisanori Okamoto, Owariasahi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 11/154,732

(22) Filed: Jun. 17, 2005

(65) Prior Publication Data
US 2005/0281545 A1 Dec. 22, 2005

(30) Foreign Application Priority Data
Jun. 18, 2004 (JP) ............... 2004-181835

(51) Int. Cl.
*H02P 23/12* (2006.01)
(52) U.S. Cl. .............. 318/400.14; 318/400.38; 318/400.01
(58) Field of Classification Search ................. 318/138, 318/254, 439, 685, 696, 700, 400.01, 400.07, 318/400.14, 400.38; 388/800–806
See application file for complete search history.

(56) References Cited

U.S. PATENT DOCUMENTS 4,712,118 A * 12/1987 Seto et al. .................... 347/248
4,808,901 A * 2/1989 Sakamoto .................... 318/687
6,297,603 B1 * 10/2001 Carobolante ................. 318/254
7,109,673 B2 * 9/2006 Okamoto ..................... 318/254

FOREIGN PATENT DOCUMENTS

| JP | 04-106515 | * | 4/1992 |
|---|---|---|---|
| JP | A 9-34332 | | 2/1997 |
| JP | 10-073780 | * | 3/1998 |
| JP | A 2000-316289 | | 11/2000 |
| JP | A 2001-61297 | | 3/2001 |
| JP | A 2002-374694 | | 12/2002 |

* cited by examiner

*Primary Examiner*—Rina I Duda
(74) *Attorney, Agent, or Firm*—Oliff & Berridge, PLC

(57) ABSTRACT

A motor drive device having a motor drive unit, a controller, and a rotational detector. The motor drive unit drives a brushless DC motor, the brushless DC motor has a rotor. The controller produces a motor driving signal to drive the brushless DC motor. The a rotational detector detects a rotational state of the brushless DC motor to produce a rotational state signal. The controller receives the rotational state signal from the rotational detector, determines a phase-switching timing to switch a phase of the brushless DC motor based on the rotational state signal, and transmits the phase-switching timing as the motor driving signal to the motor driver.

16 Claims, 14 Drawing Sheets

FIG.12(a)

| CONDITION | CURRENT FOR SCANNER MOTOR | CURRENT FOR MAIN MOTOR |
|---|---|---|
| CONDITION 1 | Ia1 | Ib1 |
| CONDITION 2 | Ia2 | Ib2 |
| CONDITION 3 | Ia3 | Ib3 |

FIG.12(b)

MAXMUM PERMISSIBLE CURRENT

| TIME PERIOD | A2 | B2 |
|---|---|---|
| t0~t1 | A1(1.0A) | D-A2 |
| t1~t2 | D-B2 | B1(1.8A) |
| t2~ | A3(0.4A) | B3(0.6A) |

FIG.14(a)

(t1<ta) CURRENTS FOR MOTORS

| TIME PERIOD | A2 | B2 |
|---|---|---|
| t0~t1 | A1(1.0A) | D-A2 |
| t1~t2 | D-B2 | B1(1.8A) |
| t2~ | A3(0.4A) | B3(0.6A) |

FIG.14(b)

(t1>ta) CURRENTS FOR MOTORS

| TIME PERIOD | A2 | B2 |
|---|---|---|
| t0~t1 | A1(1.2A) | D-A2 |
| t1~t2 | D-B2 | B1(1.7A) |
| t2~ | A3(0.4A) | B3(0.6A) |

MOTOR DRIVE DEVICE AND IMAGE-FORMING DEVICE INCLUDING THE SAME

BACKGROUND OF THE INVENTION

1. Technical Field

The invention relates to a motor drive device and an image-forming device including the same.

2. Related Art

A conventional motor drive device for controlling a brushless DC motor is provided with a control circuit that performs digital control and a motor drive circuit that drives the motor in response to instructions from the control circuit. For example, Japanese Patent Publication No. 2001-61297 discloses an image-forming device having a speed determination circuit and a motor lock circuit provided within an application-specific integrated circuit (ASIC) chip. The ASIC produces a signal for a motor driver IC having a Hall-effect amplifier and a phase-switching circuit, thereby driving the brushless DC motor.

However, in the conventional motor drive device, a phase-switching circuit is provided within the motor drive circuit, as disclosed in Japanese Patent Publication No. 2001-61297. Therefore, the circuit configuration tends to be complicated, which may lead to an increase in size and cost of the device. When the motor drive circuit is mounted on a circuit board with other analog servo circuitry, the analog servo circuitry may be affected by heat generated by the motor drive circuit, leading to unstable control.

SUMMARY

In order to solve the above problems, an object of the present invention is to provide a motor drive device to drive a brushless DC motor, which stabilizes phase switching and contributes to reducing in the size and cost of the device.

The present invention provides a motor drive device having a motor drive unit, a controller, and a rotational detector. The motor drive unit drives a brushless DC motor, the brushless DC motor has a rotor. The controller produces a motor driving signal to drive the brushless DC motor. The a rotational detector detects a rotational state of the brushless DC motor to produce a rotational state signal. The controller receives the rotational state signal from the rotational detector, determines a phase-switching timing to switch a phase of the brushless DC motor based on the rotational state signal, and transmits the phase-switching timing as the motor driving signal to the motor driver.

The present invention provides a motor drive device having: a motor drive unit, a controller, a rotational detector, a gain setting unit, and a gain selection unit. The motor drive unit drives a brushless DC motor. The controller produces a motor driving signal to drive the brushless DC motor. The rotational detector detects a rotational state of the brushless DC motor to produce a rotational state signal. The gain setting unit sets a plurality of gains. The gain selection unit selects one among the plurality of gains. The controller determines a rotational speed of the brushless DC motor based on the selected gain and the rotational state signal, and transmit the rotational speed as the motor driving signal to the motor driver.

BRIEF DESCRIPTION OF THE DRAWINGS

The particular features and advantages of the invention as well as other objects will become apparent from the following description taken in connection with the accompanying drawings, in which:

FIGS. 12(*a*) and 12(*b*) show examples of setting with the current controller;

FIGS. 14(*a*) and 14(*b*) show examples of setting with the current controller;

DESCRIPTION OF THE EMBODIMENTS

Preferred embodiments of the present invention will be described with reference to the accompanying drawings. The following description will be made for explaining an overall configuration of a laser printer 1.

Figure 1:
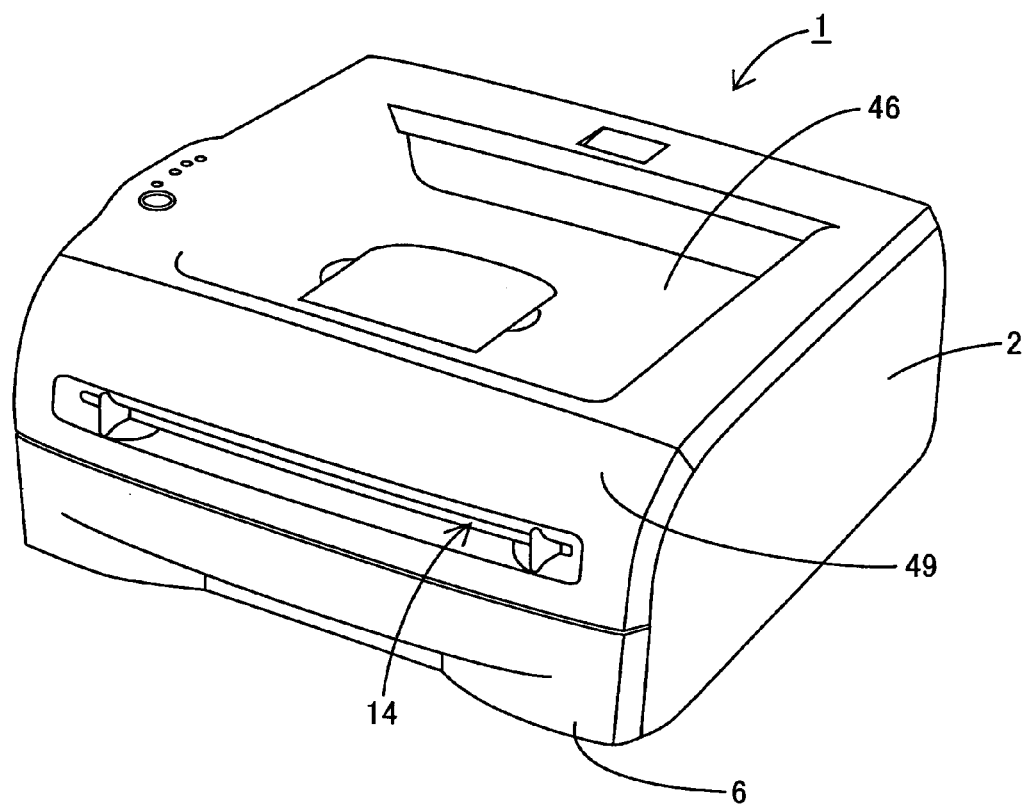
FIG. 1 is a perspective view of a laser printer according to the present invention.
Figure 2:
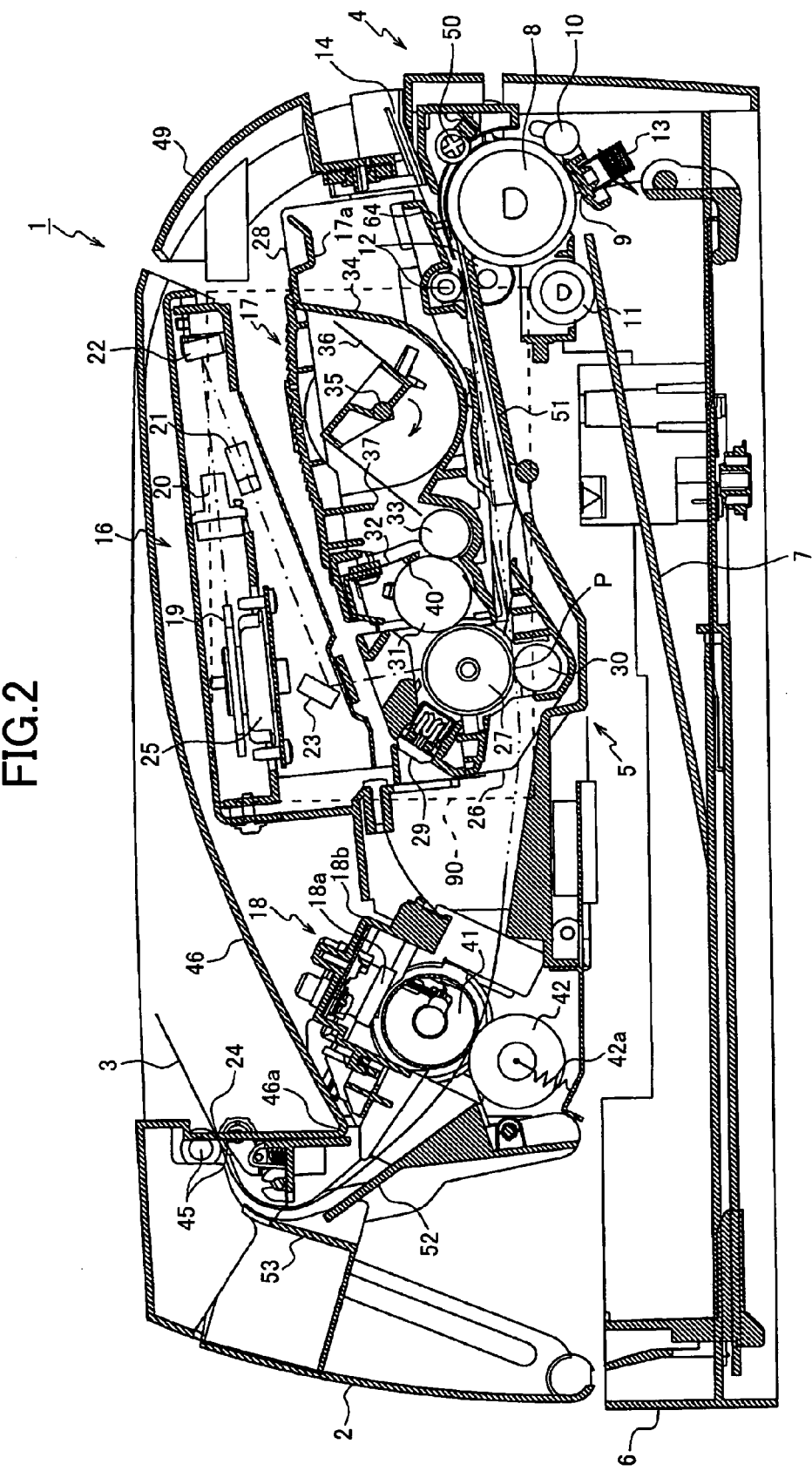
FIG. 2 is a vertical sectional view of the laser printer of FIG. 1.

Referring to FIG. 1, the printer 1 has a main casing 2. Referring to FIG. 2, the printer 1 includes a feeder portion 4 for supplying paper 3 and an image formation portion 5 for forming an image on the paper 3 within the main casing 2. The printer 1 further has a paper-delivery tray 46 in an upper portion of the printer 1 for carrying the printed paper 3. It should be noted that the expressions "front", "rear", "above" and "below" are used throughout the description to define the various parts when the printer 1 is disposed in an orientation in which it is intended to be used.

As shown in FIG. 2, the feeder portion 4 is provided with a paper-supply tray 6, a paper pressure plate 7 provided within the paper-supply tray 6, a feed roller 11 provided above one end of the paper-supply tray 6, a paper-supply roller 8 together with a separation pad 9, a pinch roller 10 facing the paper-supply roller 8, a paper-dust removal roller 50, and registration rollers 12 provided on the downstream side of the paper-dust removal roller 50 in the conveying direction of the paper 3.

The paper-supply tray 6 is loaded in a removable manner into a base portion of the main casing 2, for storing the paper 3 in a stack manner. The paper-supply tray 6 is pulled out from a front side of the printer 1 (the right side in FIG. 2) when the paper 3 is to be replenished. When the paper-supply tray 6 is pulled out, the feeder portion 4 is divided into two parts, an upper part and a lower part, between the paper-supply roller 8 and the separation pad 9. The paper-supply tray 6 is pulled out from the printer 1 together with the pinch roller 10, the separation pad 9, and a spring 13 provided behind the separation pad 9.

The paper pressure plate 7 is supported in a pivoting manner about one end thereof that is further from the paper-supply roller 8, so that the other end of the paper pressure plate 7 that is closer to the paper-supply roller 8 can move up or down. The paper pressure plate 7 is urged upward by a spring (not shown). Accordingly, the paper pressure plate 7 is configured to be pressed downward against the elastic force of the spring about the one end of paper pressure plate 7, as the amount of the stacked paper 3 thereon increases.

The feed roller 11 is mounted to be in contact with the uppermost sheet of the stacked paper 3 in the paper-supply tray 6 by the paper pressure plate 7. The feed roller 11 feeds the paper 3 to the position between the paper-supply roller 8 and the separation pad 9 at which the paper-supply roller 8 then conveys the paper 3.

The separation pad 9 is disposed at the position facing the paper-supply roller 8. The separation pad 9 is pressed to the paper-supply roller 8 by the spring 13 disposed on the rear side of the paper-supply roller 8. The separation pad 9 prevents a plurality of stacked sheets from feeding to the conveyor path simultaneously. The stacked sheets 3 fed by the feed roller 11 impinge on the paper-supply roller 8 and the separation pad 9. At this time, the separation pad 9 comes into contact with only the uppermost sheet 3 to apply a suitable frictional force to only the uppermost sheet 3, thereby conveying only the uppermost sheet. In other words, any sheets of the paper 3 other than the uppermost sheet 3 are held back by the separation pad 9, even if the plurality of sheets of the paper 3 is fed by the feed roller 11 to the separation pad 9. This structure ensures that one sheet of paper 3 is supplied out of the paper-supply tray 6 by the paper-supply roller 8 once.

The paper-supply roller 8 conveys the paper 3 onto the conveyor path of the paper 3 (shown by a dot-dot-dashed line in FIG. 2). After the paper-dust removal roller 50 removes paper-dust from the paper 3 and conveys the paper 3 to the registration rollers 12.

The conveyor path extends in a downward direction from a horizontal direction over the entire region from the upper portion of the paper-supply roller 8 to an image formation position P. Most of the conveyor path from the paper-supply roller 8 to the image formation position P is formed of a base portion of a process unit 17 and a guide member 51.

The paper-supply roller 8 reverses the direction of the paper 3 through approximately 180 degrees to sends the paper 3 to the registration rollers 12. However, if the paper 3 including thick paper such as a postcard obtains a big curvature by the paper-supply roller 8, the paper 3 may become folded or may not reach the registration rollers 12 due to the stiffness against bending of the paper 3.

To avoid the above troubles, the paper-supply roller 8 has a larger diameter than those of a photosensitive drum 27 and a fixer roller 41. In this embodiment, the photosensitive drum 27 has a diameter of 24 mm. The fixer roller 41 and the paper-supply roller 8 have diameters of 25 mm and 33 mm, respectively. As described above, when the paper-supply roller 8 has a relatively large diameter to make the curvature of the rounded paper 3 small, the paper-supply roller 8 can convey the paper 3 in a suitable manner without folding the paper 3.

The registration rollers 12 are configured of a pair of rollers. The registration rollers 12 are controlled by a control device (not shown) mounted on a circuit board 90 that will be described later, in response to an output signal from a position sensor 64 located in the vicinity of the paper-supply roller 8. The position sensor 64 is a mechanical type. The control device causes the registration rollers 12 to correct the inclination of the paper 3. In other words, the control device suspends the registration rollers 12 when the position sensor 64 detects the leading edge of the paper 3 while the paper-supply roller 8 conveying the paper 3. When the paper 3 comes into contact with the registration rollers 12 and goes slackened, the control device again rotates the registration rollers to send the paper 3 to the image formation portion 5.

A manual paper-supply port 14 for supplying the paper 3 to the registration rollers 12 from the front of the printer 1 is formed slightly above the paper-supply roller 8. Accordingly, the paper 3 can be fed to the conveyor path from the manual paper-supply port 14.

The image formation portion 5 is provided with a scanner unit 16, the process unit 17, and a fixer unit 18. The scanner unit 16 is disposed in the upper portion of the main casing 2. The scanner unit 16 includes a laser generating unit (not shown), a polygon mirror 19 rotated by a scanner motor 25, lenses 20 and 21, and mirrors 22 and 23. The scanner motor 25 is configured of a brushless DC motor. The laser generating unit emits a laser beam on the basis of predetermined image data. The polygon mirror 19, the lens 20, the mirror 22, the lens 21, and the mirror 23 reflect or pass the laser beam in sequence, as shown by the dot-dash lines in FIG. 2. The scanner unit 16 then irradiates and scans the surface of the photosensitive drum 27 of the process unit 17 with the laser beam at a high speed.

More specifically, the polygon mirror 19 is located immediately above the photosensitive drum 27 and the image formation position P in the scanner unit 16. The polygon mirror 19 reflects the laser beam to direct the laser beam to the reflective mirror 22 in a substantially horizontal direction. The mirror 22 then reflects the laser beam to the mirror 23 positioned immediately below the polygon mirror 19. In other words, the mirror 22 reflects the laser beam that incident thereon downward at an acute angle 15° from the horizontal direction.

The scanner unit 16 has a suitable size and shape that do not interfere with the optical path of the laser beam. In other words, the upper surface (upper plate) of the scanner unit 16 is located in a substantially horizontal direction, in this embodiment, at a slant such that the one end of the upper surface further from the paper-supply roller 8 is lower than the other end thereof. The lower surface (lower plate) of the scanner unit 16 is at a larger slant than the upper surface, so that one end of the lower surface further from the paper-supply roller 8 is lower than the other end thereof. Therefore, the scanner unit 16 has an elongated shape that has thicker one side at the vicinity of the polygon mirror 19 than the other side adjacent to the paper-supply roller 8 side.

The process unit 17 is positioned below the scanner unit 16. The process unit 17 is loaded in a removable manner into the main casing 2. In other words, The process unit 17 is loaded from or pulled out of the front of the casing 2 in the substantially horizontal direction.

The process unit 17 is configured of a drum cartridge 26 and a developer cartridge 28. A space gap is formed between the process unit 17 and the scanner unit 16. The drum cartridge 26 is provided with the photosensitive drum 27, a scorotron-type charger 29, and a transfer roller 30. The developer cartridge 28 is provided with a developer roller 31, a layer thickness regulation blade 32, a toner supply roller 33, and a toner box 34. The developer cartridge 28 can be attached and removed with the drum cartridge 26.

The photosensitive drum 27 and the toner box 34 occupy a comparatively large space in the main casing 2. However, the photosensitive drum 27 and the toner box 34 are positioned not to cover the registration rollers 12 and the paper-supply roller 8 that also occupies a comparatively large space in the vicinity of the process unit 17.

The toner box 34 is filled with toner. An agitator 36 is supported by a rotational shaft 35 provided at the center of the toner box 34 to rotate clockwise. The rotating agitator agitates the toner within the toner box 34 to discharge the toner through a toner supply port 37 on the toner box 34.

The toner supply roller 33 is positioned beside the toner supply port 37 to rotate counterclockwise. The developer roller 31 is positioned facing the toner supply roller 33 in order to rotate counterclockwise. The toner supply roller 33 and the developer roller 31 are in contact with each other so that each of rollers 31 and 33 is compressed to a certain degree.

The toner supply roller 33 is a roller having a metal roller shaft and being covered with an electrically conductive foamed material. The developer roller 31 is a roller having a metal roller shaft and being covered with an electrically conductive and nonmagnetic rubber material. More specifically, the roller portion of the developer roller 31 is such that the surface of a main roller made of silicon rubber or an electrically conductive urethane rubber including carbon particles is covered with a coating layer of urethane rubber or silicon rubber including fluoride. In the operation of the developer roller 31, a bias voltage is applied to the developer roller 31.

The layer thickness regulation blade 32 is positioned in the vicinity of the developer roller 31. The layer thickness regulation blade 32 has a pressure portion 40 made of an insulating silicon rubber on a leading-edge of a main blade made of a metal leaf spring. The pressure portion 40 has a semicircular section. The layer thickness regulation blade 32 is supported at a close position to the developer roller 31 on the developer cartridge 28. The pressure portion 40 is urged to the developer roller 31 by the elastic force of the main blade.

The rotation of the toner supply roller 33 feeds toner passed through the toner supply port 37 to the developer roller 31. At this time, the toner is charged positively due to the friction between the toner supply roller 33 and the developer roller 31. The rotation of the developer roller 31 feeds the toner on the developer roller 31 to a gap between the developer roller 31 and the pressure portion 40 of the layer thickness regulation blade 32. The toner is further charged positively between the developer roller 31 and the pressure portion 40 and is then carried on the developer roller 31 as a thin layer having a constant thickness.

The photosensitive drum 27 is positioned beside the developer roller 31 to rotate clockwise while facing the developer roller 31. The photosensitive drum 27 has a main drum that is grounded and has a surface made of a positively charged photosensitive layer such as polycarbonate. The photosensitive drum 27 is rotated by the driving force of a main motor 118 (See FIG. 4).

The scorotron-type charger 29 is positioned at a predetermined distance from the photosensitive drum 27 not so as to touch the photosensitive drum 27. In particular, the scorotron-type charger 29 is positioned in the radial direction of the photosensitive drum 27 at approximately 30 degrees above the horizontal direction. The scorotron-type charger 29 is a positively charging scorotron type of charger that generates a corona discharge from charger wires of tungsten. The scorotron-type charger 29 charges the surface of the photosensitive drum 27 uniformly and positively.

The surface of the photosensitive drum 27 is first uniformly and positively charged by the scotron-type charger 29, as the photosensitive drum 27 rotates. The photosensitive drum 27 is then exposed by a high-speed scan of the laser beam from the scanner unit 16, so that a latent electrostatic image based on predetermined image data is formed on the surface of the photosensitive drum 27.

Next, as the developer roller 31 rotates, the positively charged toner on the developer roller 31 becomes into contact with the photosensitive drum 27. At this time, the toner is supplied to the latent electrostatic image on the surface of the photosensitive drum 27, that is, the portions of the photosensitive drum 27 which are uniformly and positively charged, are exposed by the laser beam, have the resultant reduced potential The toner supplied to the exposed portions makes a visible image, thereby achieving negative development.

The transfer roller 30 is positioned below the photosensitive drum 2, facing the photosensitive drum 27 to be supported by the drum cartridge 26 and rotate counterclockwise direction. The transfer roller 30 has a metal roller shaft covered with an ion electrically conductive rubber material. A transfer bias is applied to the transfer roller 30 during the operation of the transfer roller 30. The visible image carried on the surface of the photosensitive drum 27 is transferred to the paper 3 as the paper 3 passes between the photosensitive drum 27 and the transfer roller 30 (through an image formation position P).

The fixer unit 18 is positioned on the downstream side of the process unit 17 in the paper conveying direction. The fixer unit 18 is provided with a fixer roller 41 having gears, a pressure roller 42 for pressing against the fixer roller 41, and a thermostat 18a. The fixer roller 41 and the thermostat 18a are covered by a cover 18b.

The fixer roller 41 is made of metal and is provided with a halogen lamp for heating. The pressure roller 42 is provided with a spring 42a that presses (urges) the pressure roller 42 from below to the central axis of the fixer roller 41 in a rotatable manner. The pressure roller 42 is in contact with one of the fixer roller 41 and the paper 3. The pressure roller 42 rotates in synchronization with the fixer roller 41.

The thermostat 18a is made of a bimetal strip. The thermostat 18a turns on or off the heater for heating the fixer roller 41 in accordance with the amount of the heat generated by the fixer roller 41, thereby preventing the pressure roller 42 from being heated at a higher temperature than a predetermined temperature.

The thermostat 18a is positioned above the fixer roller 41 on the imaginary line extending through the rotational centers of the pressure roller 42 and the fixer roller 41. The position of the thermostat 18a contributes the lower position of a depression 46a of the paper-delivery tray 46, compared to the configuration in which the thermostat 18a is either directly above the fixer roller 41 or rearward from directly above the fixer roller 41 (on the downstream side of the fixer roller 41 in FIG. 2).

The cover 18b has a shape such as to cover the side and top of the fixer roller 41. Therefore, the cover 18b prevents the heat generated by the fixer roller 41 from radiating out of the fixer unit 18 in order to protect other components such as the scanner unit 16 in the main casing 2 from the heat. The cover 18b merely supports the central shaft (not shown) of the pressure roller 42 in a rotatable manner to move the pressure roller 42 in the pressing direction of the spring 42a. The lower portion of the pressure roller 42 is exposed from the cover 18b. For that reason, the height of the printer 1 can be reduced by the height of the cover 18b, in comparison with a configuration in which the cover 18b also covers the lower portion of the pressure roller 42.

In the fixer unit 18, the fixer roller 41 fixes the toner that has been transferred on the paper 3 to the paper 3 by heating and pressing the paper 3, when the paper 3 is passing between the fixer roller 41 and the pressure roller 42. The fixer roller 41 then conveys the paper 3 having the fixed image, along a paper-delivery path formed by guide members 52 and 53 to a pair of delivery rollers 45. The delivery rollers 45 ejects the paper 3 onto the paper-delivery tray 46. The delivery rollers 45 function as a delivery port 24 for ejecting the paper 3 out of the printer 1.

If the paper 3 is made to bend abruptly after being heated by the fixer roller 41, the paper 3 might not return from the curved state to the original flat state. In order to avoid the bend of the paper 3, the guide members 52 and 53 guide the heated paper 3 while maintaining the paper 3 in a substantially straight manner after the passage thereof past the fixer roller 41. Then, the guide members 52 and 53 guide the paper 3, bending the paper 3 with a relatively large curvature, as the paper 3 approaches the delivery rollers 45.

The above-described configuration enables a lower positioning of the delivery port 24, compared that the entire delivery path of the paper 3 is made with a smaller curvature. Accordingly, the printer 1 can easily reduce its height, while preventing permanent bend of the paper 3.

The paper-delivery tray 46 has a shape such that the base of the tray 46 gradually descends from the front side of the printer 1 to the rear side (the left side in FIG. 2). The lowermost portion of the paper-delivery tray 46 (the depression 46a) is positioned at a lower position than the upper portion of the fixer unit 18. Therefore, the paper-delivery tray 46 can be positioned lower than the position of the delivery rollers 45, without reducing the maximum number of stackable sheets of paper 3 in the paper-delivery tray 46. Thus the height of the portion of the printer 1 under which the scanner unit 16 is disposed can be made closer to the height of another portion of the printer 1 under which the delivery rollers 45 are disposed. This structure contributes to the improvement of the design of the printer 1.

In addition, the circuit board 90 having the control devices for controlling the rollers described above and the polygon mirror 19 is positioned on a side surface of the paper conveying path (in the vicinity of a side surface of the process unit 17), as shown by broken lines in FIG. 2.

Figure 3:
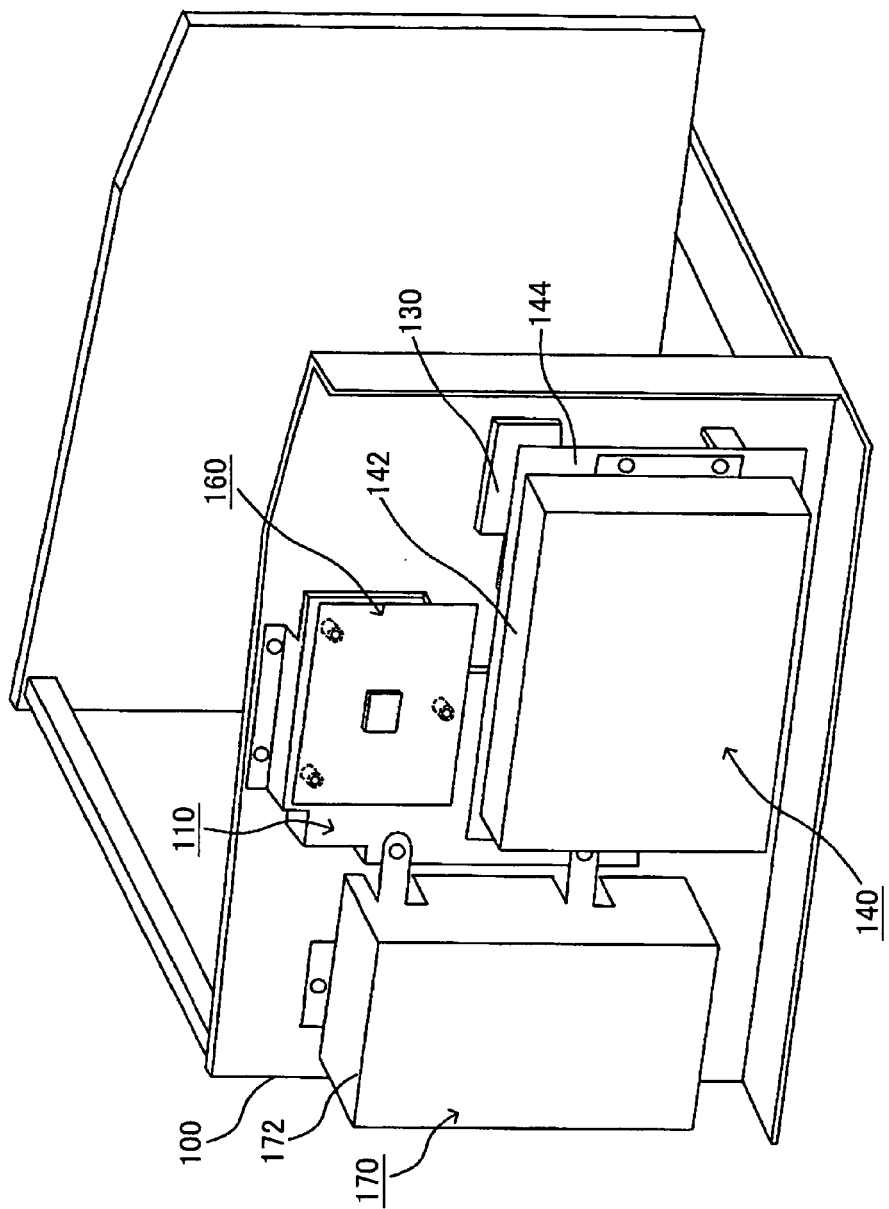
FIG. 3 is a perspective view showing the circuit board units of the printer.

As shown in FIG. 3, a main frame 100 is provided within the main casing 2 of FIG. 1. The main frame 100 is configured to support the various components shown in FIG. 2 and provided on one side surface with other components such as the various units of a circuit board unit.

One side surface of the main frame 100 supports the structural elements of the laser printer 1, such as the image formation portion 5. The main frame 100 is provided with a gear unit 110 to transfer rotating power to the photosensitive drum 27, a low-voltage power board unit 140 to covert commercial AC power into DC power, an engine board 160 to control the image formation operation, a main board unit 170 for an image data processing, and an attachment plate 130 to attach the low-voltage power board unit 140 to the main frame 100.

Since the low-voltage power board unit 140 is the heaviest component among the low-voltage power board unit 140, the engine board 160, and the main board unit 170, the attachment position of the low-voltage power board unit 140 is determined to face the lower portion of the gear unit 110. The engine board 160 is attached at the position facing the upper portion of the gear unit 110.

Figure 4:
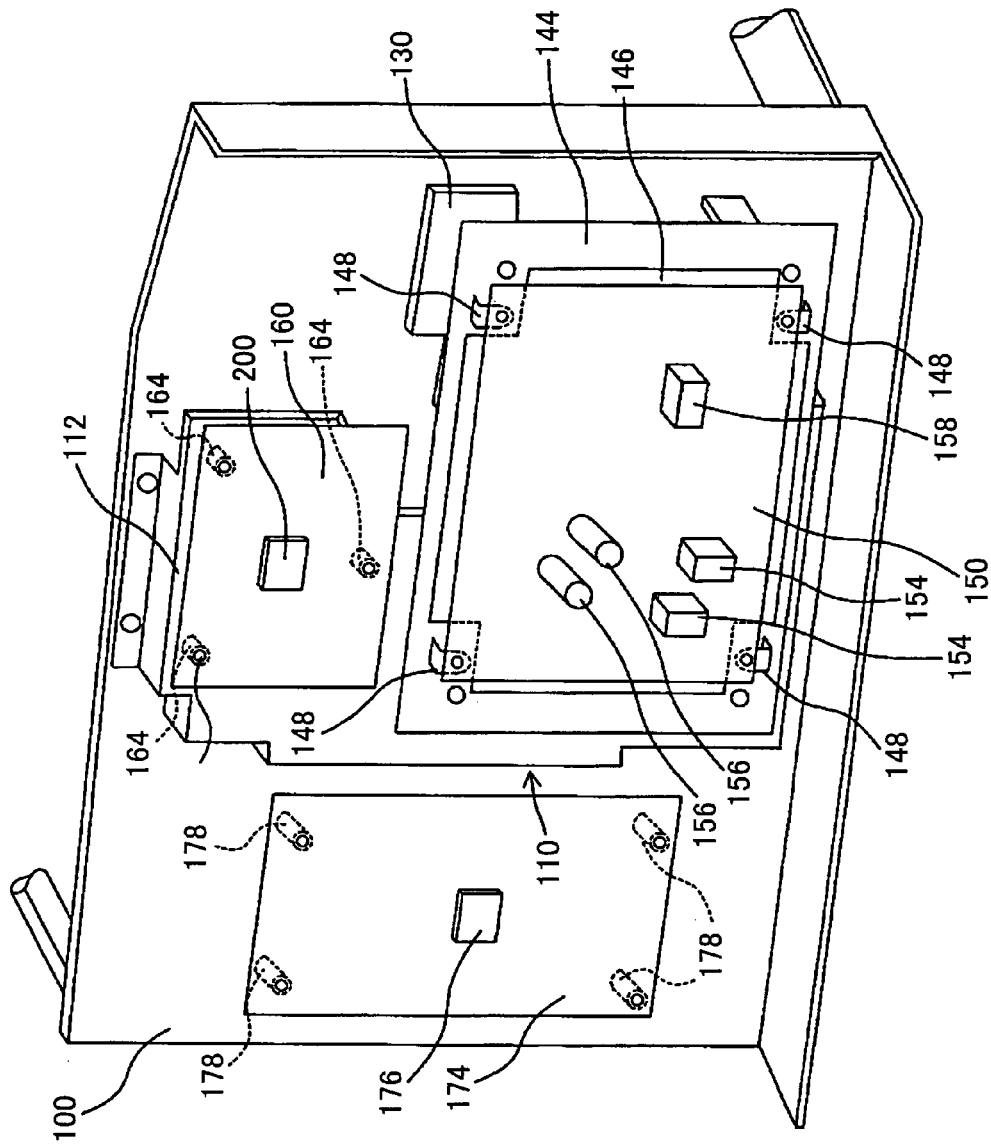
FIG. 4 is a perspective view showing the circuit board units of the printer.
Figure 6:
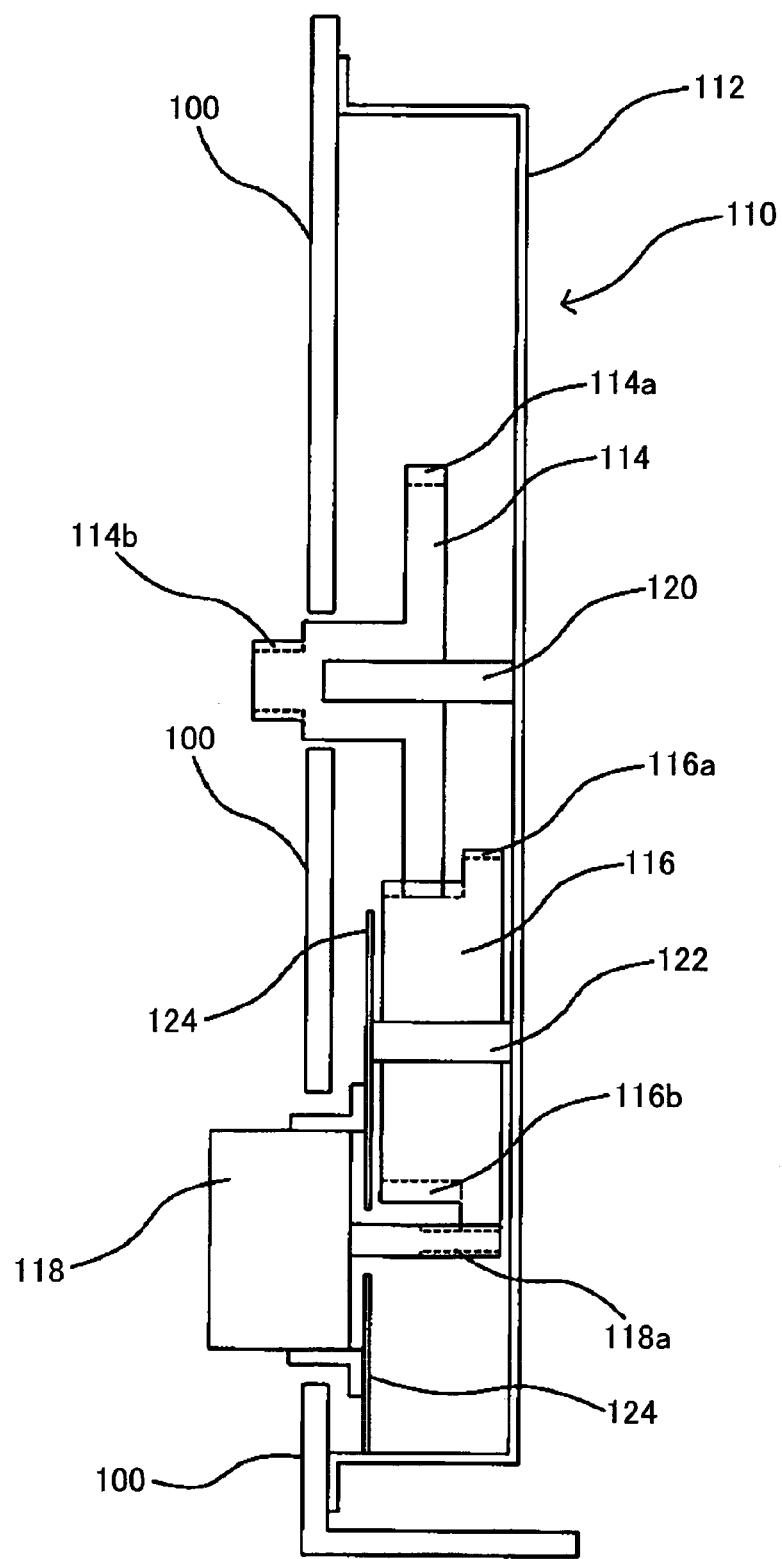
FIG. 6 is a schematic side view showing the gear unit of the printer.

The low-voltage power board unit 140 is configured of an electromagnetic shield cover 142, an electromagnetic shielding plate 144, and a low-voltage power board 150 (see FIG. 6). The main board unit 170 is configured of a cover 172 and a main board 174 which is shown in FIG. 4. The electromagnetic shield cover 142 and the electromagnetic shielding plate 144 are designed to restrain electromagnetic noise generated outside the low-voltage power board unit 140 from affecting the low-voltage power board 150 which is shown in FIG. 4, and also restrain electromagnetic noise generated by the low-voltage power board 150 from affecting external devices.

The next description will be made for explaining the configuration of the gear unit 110, referring to FIGS. 5 and 6.

Figure 5:
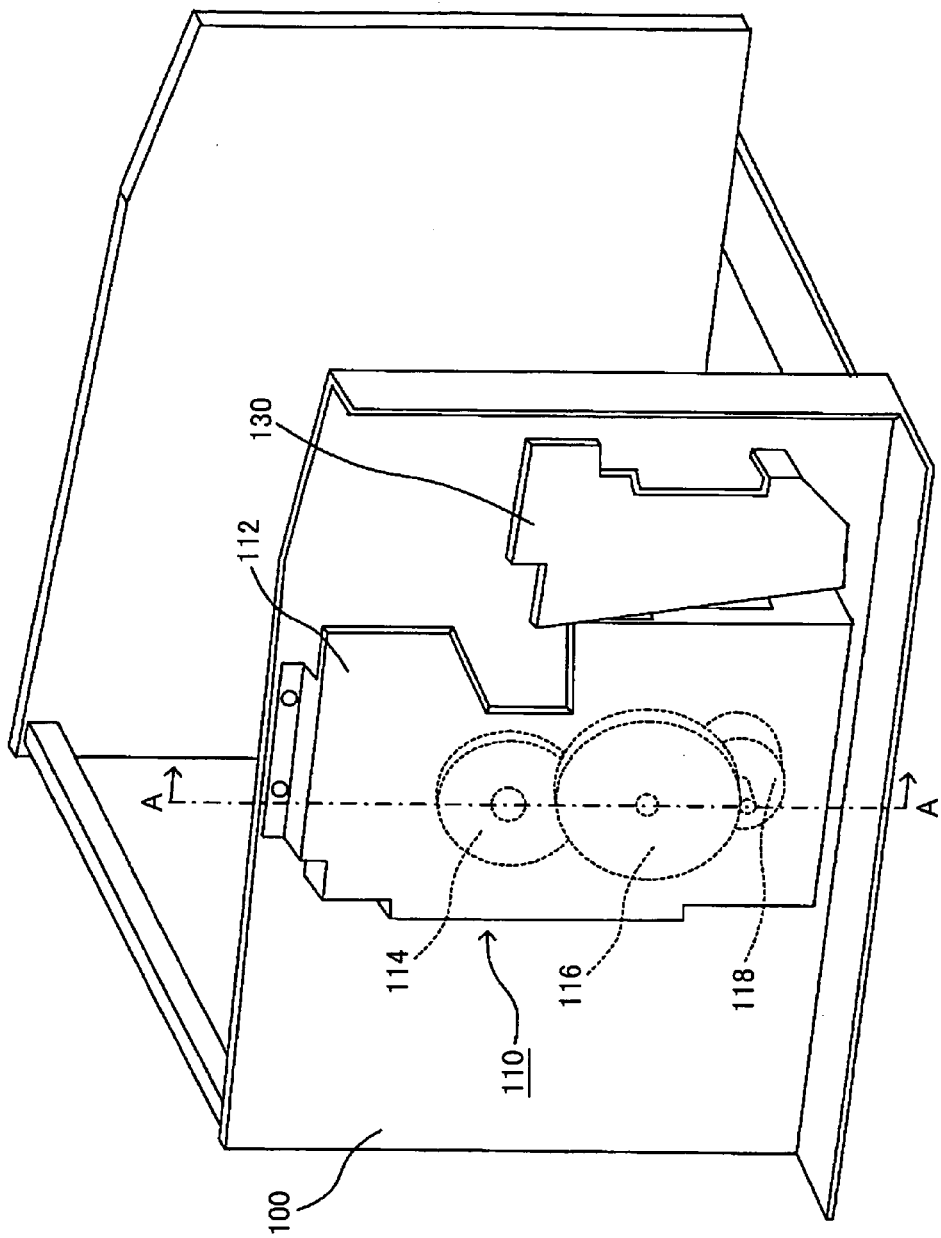
FIG. 5 is a perspective view showing the gear units of the printer.

As shown in FIG. 5, the gear unit 110 is affixed by screws to one side surface of the main frame 100. The gear unit 110 is configured of the main motor 118 for rotating the photosensitive drum 27, a gear 114 linked to the drive shaft (not shown) of the photosensitive drum 27 for transmitting the driving force from the main motor 118 to the photosensitive drum 27, and a gear 116 for transmitting the driving force of the main motor 118 to the gear 116. These components are supported by a gear frame 112.

Since the main motor 118 is the heaviest component among the gear 114, the gear 116, and the main motor 118, the main motor 118 is attached at the position below the gear unit 110.

Part of the low-voltage power board unit 140 faces the gear unit 110 (see FIG. 3), whereas the attachment plate 130 for affixing the low-voltage power board unit 140 to the main frame 100 is positioned at the similar height to that of the gear frame 112 to one side surface of the main frame 100.

As shown in FIG. 6, the gears 114 and 116 are supported rotatably by gear shafts 120 and 122 that are affixed to the gear frame 112. The main motor 118 is supported by an attachment plate 124 that is affixed to the gear frame 112.

The gear 114 is configured of a larger diameter gear 114a and a smaller diameter gear 114b having different diameters, respectively. The gears 114a and 114b are arranged coaxially and rotate integrally. Similarly, the gear 116 is configured of a larger diameter gear 116a and a smaller diameter gear 116b having different diameters, respectively. The gears 116a and 116b are coaxially arranged and rotate integrally.

The main motor 118A has a motor pinion 118a engaged with the larger diameter gear 116a of the gear 116. The smaller diameter gear 116b of the gear 116 engages with the larger diameter gear 114a of the gear 114. The smaller diameter gear 114b of the gear 114 engages with the drive shaft (not shown) of the photosensitive drum 27. Thus the rotational power generated by the main motor 118 is transmitted to the drive shaft of the photosensitive drum 27.

As shown in FIG. 6, the side surface of the main frame 100 has a hole to allow the smaller-diameter gear 114b of the gear 114 to protrude from the opposite side on which the gear unit 110 is attached. This structure ensures that the process unit 17 is attached removably to the opposite surface of the main frame 100 to which the gear unit 110 is attached, enabling the drive shaft of the photosensitive drum 27 to engage with the smaller diameter gear 114b.

The main motor 118 is disposed on the same side of the gear frame 112 as the surface to which the gears 114 and 116 are attached. The main motor 118 is hidden by the gear frame 112 so as to be invisible from the exterior of the laser printer 1.

Referring to FIG. 4, the description now turns to the internal configurations of the low-voltage power board unit 140, the engine board 160, and the main board unit 170. The electromagnetic shielding plate 144 is attached by screws to the gear frame 112 and the attachment plate 130 so as to be positioned between the gear unit 110 and the low-voltage power board 150. An insulating sheet 146 for preventing electrical contact between the electromagnetic shielding plate 144 and the low-voltage power board 150 is attached onto the electromagnetic shielding plate 144.

The electromagnetic shielding plate 144 has spacers 148 for the attachment of the low-voltage power board 150 so as to provide a gap space between the low-voltage power board 150 and the electromagnetic shielding plate 144. The low-voltage power board 150 is screwed onto the electromagnetic shielding plate 144 through the spacers 148.

The low-voltage power board 150 is provided with a primary transformer 154, a smoothing capacitor 156, and a secondary transformer 158 for converting commercial AC power into 24-volt DC power to feed the main motor 118. The primary transformer 154 and the smoothing capacitor 156 are disposed on the left side of the low-voltage power board 150. The transformer 158 is disposed on the right side of the low-voltage power board 150. For that reason, the weight of the low-voltage power board 150 is not balanced.

The primary transformer 154 is the heaviest among the primary transformer 154, the smoothing capacitor 156, and the secondary transformer 158. The low-voltage power board unit 140 is located in such a manner that the primary transformer 154 faces the main motor 118.

The engine board 160 controls the image formation operation by controlling the main motor 118. The engine board 160 is provided with an ASIC 200. Spacers for attaching the engine board 160 is attached to the gear frame 112 to provide a gap between the engine board 160 and the gear frame 112. Spacers 164 for attaching the engine board 160 is fixed on the gear frame 112. The engine board 160 is screwed onto the gear frame 112 with the spacers 164 therebetween.

The main board 174 processes image data for image formation, and is provided with an ASIC 176. Spacers 178 for attaching the main board 174 is fixed onto the main frame 100 to provide the gap between the main board 174 and the main frame 100. The main board 174 is screwed onto the main frame 100 with the spacers 178 therebetween.

The next description will be made for explaining a motor drive device 190 to drive the scanner motor 25 and main motor 118.

Figure 7:
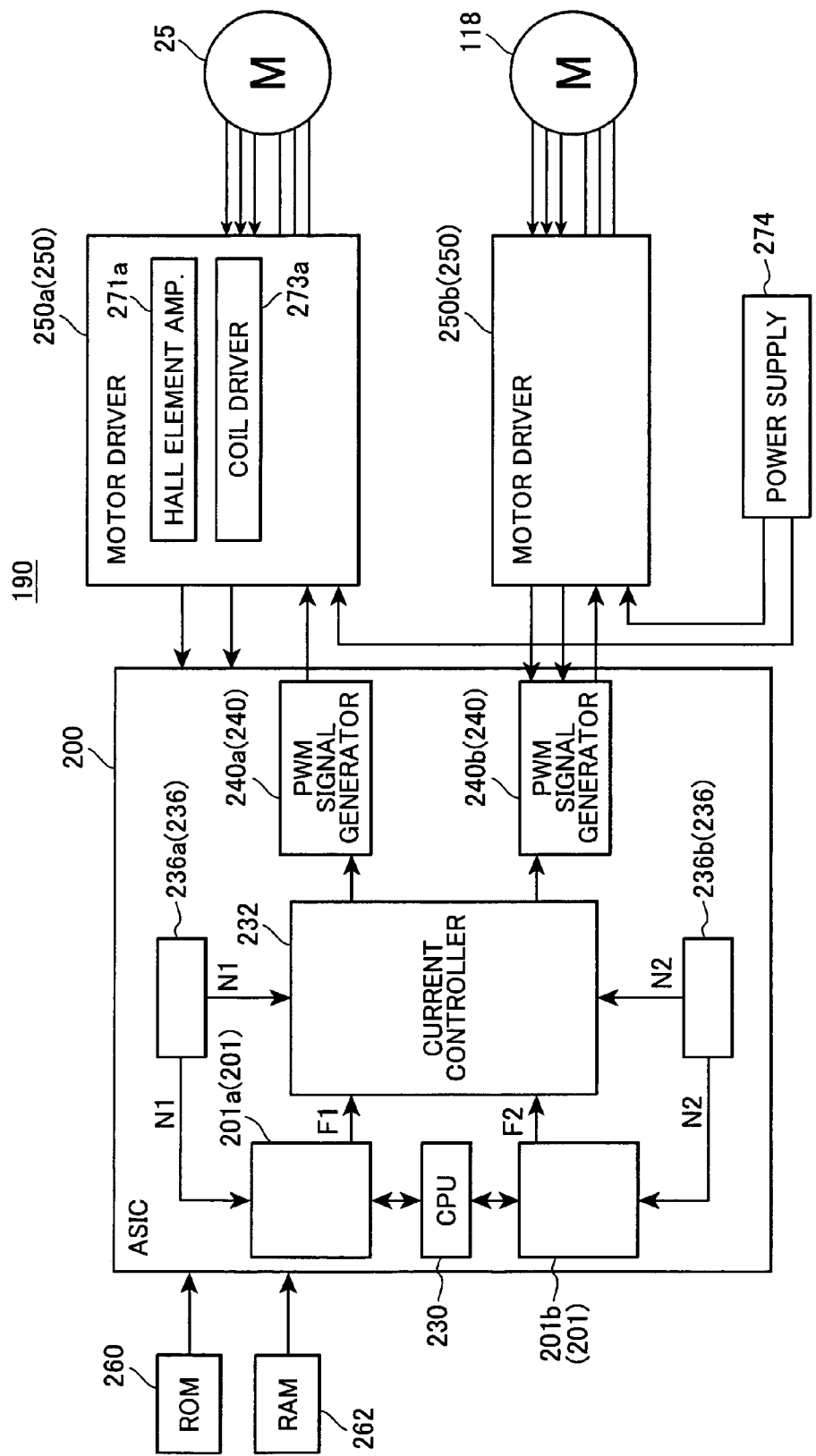
FIG. 7 is a block diagram showing a motor drive device according to the present invention.

Referring to FIG. 7, the motor drive device 190 includes the ASIC 200 and two motor drivers 250*a* and 250*b*. The ASIC 200 and the motor drivers 250*a* and 250*b* are provided on different circuit boards. The ASIC 200 receives and transfers data in digital form, enabling digital processing. The motor drivers 250*a* and 250*b* drive the scanner motor 25 and the main motor 118, respectively, based on digital signal from the ASIC 200. ROM 260 and RAM 262 are connected to the ASIC 200.

Figure 8:
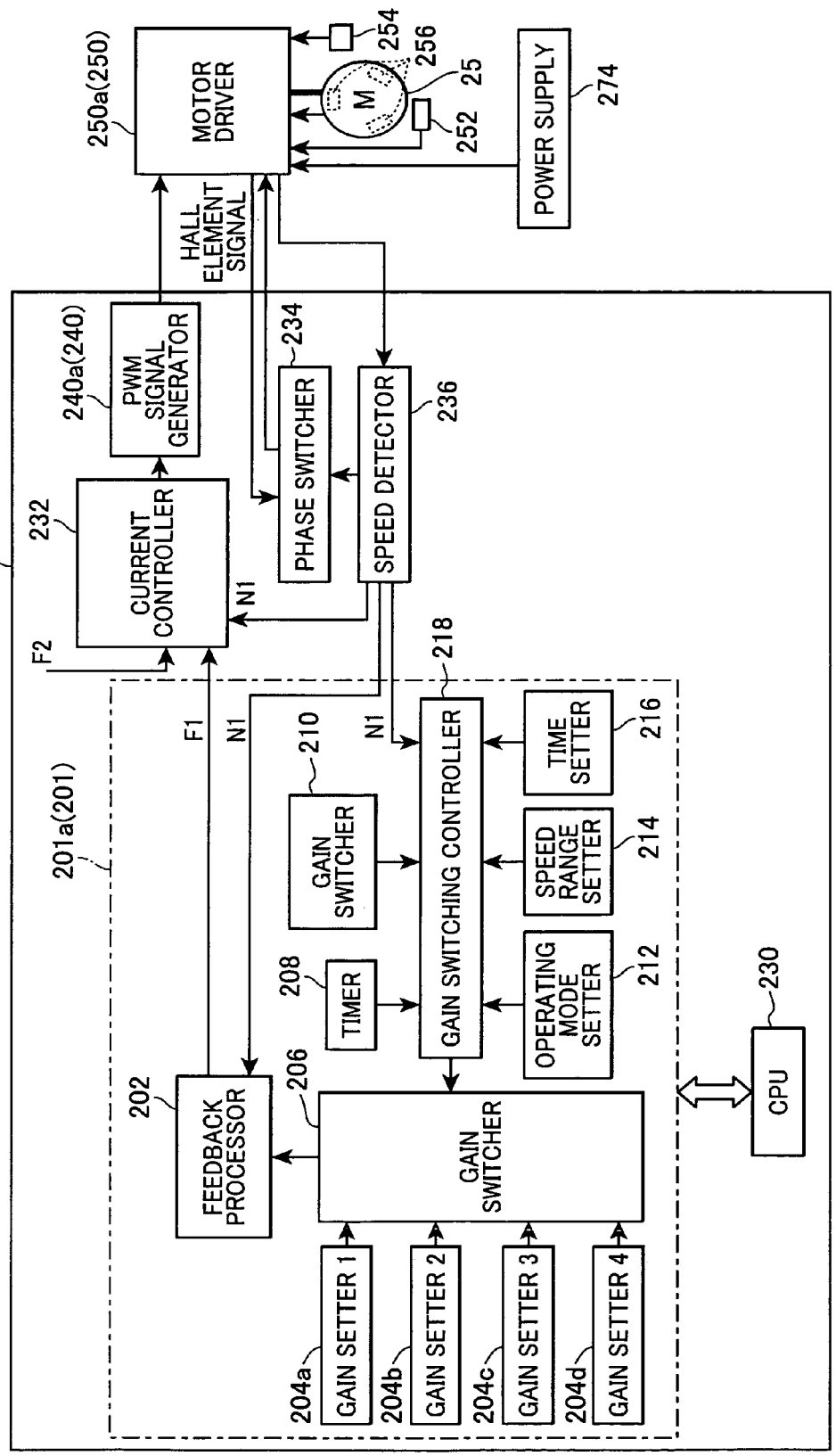
FIG. 8 is a block diagram showing partially details of the motor drive device of FIG. 7.

Referring to FIG. 8, the ASIC 200 includes a CPU 230. The ASIC 200 includes a speed detector 236, a phase switcher 234, a feedback controller 201, and a PWM signal generator 240 for the scanner motor 25. The ASIC 200 further includes a speed detector (not shown), a phase switcher (not shown), a feedback controller 201*b*, and a PWM signal generator 240*b* for the main motor 118.

The next description will explain the details of the speed detector. Referring to FIG. 8, a frequency generator (FG) signal generator 252 is provided for the scanner motor 25. The speed detector 236 detects the speed of the scanner motor 25 based on the FG signal produced from the FG signal generator 252.

The FG signal generator 252 has an FG pattern formed on the board and a magnet provided on the rotor board side of the scanner motor 25. The FG signal generator 252 produces a signal having a waveform corresponding to rotational frequency of the scanner motor 25 by the FG pattern and the magnet, and transfers the signal to the motor driver 250*a*. The motor driver 250*a* amplifies the signal from the FG signal generator 252, converts the amplified signal into a digital signal, and sends the resultant signal as the FG signal of a waveform corresponding to the rotational speed to the ASIC 200. The speed detector 236 detects the rotational speed of the scanner motor 25, based on the FG signal.

The scanner motor 25 rotates the polygon mirror 19. The scanner motor 25 is provided with a beam detector (BD) sensor 254 to detect the laser beam reflected off the polygon mirror 19 as another rotation detector.

The BD sensor 254 produces a signal, as the scanner motor 25 rotates. More specifically, the BD sensor 254 detects the light beam reflected from the polygon mirror positioned at a predetermined angle. If the polygon mirror has six sides, the reflected light beam is detected six times per rotation. An output signal based on the detection of the reflected light beam is transferred from the BD sensor to the motor driver 250*a*, converted into a digital signal in the motor driver 250*a*, and received by the ASIC 200 as a BD signal having the waveform corresponding to the rotational speed. The above-described configuration ensures that the speed detector 236 detects the rotational speed of the scanner motor 25, based on the BD signal.

As described above, the ASIC 200 receives the FG signal and the BD signal. The speed detector 236 detects the rotational speed of the scanner motor 25 based on at least one of the FG and BD signals.

Specifically, the FG signal is used as the speed detection signal when the rotational speed of the scanner motor 25 is less than or equal to a predetermined speed, i.e., when the rotational speed of the polygon mirror 19 is less than or equal to a predetermined speed. The BD signal is used as the speed detection signal when the rotational speed of the scanner motor 25 exceeds the predetermined speed. A reference rotational speed Na is used as the predetermined speed to discriminate between a startup state and a steady operating state. In this case, the FG signal is used in the startup state and the BD signal is used in the steady operating state. The detected rotational speed of the scanner motor 25 is used for a speed instruction value calculation processing by a feedback calculation processor 202, a gain switching processing by a gain switching controller, and a phase switching processing by a phase switcher.

A speed detector (not shown) for the main motor 118 is provided. However, no BD sensor is provided for the main motor 118. Only an FG signal generator (not shown) is provided for the main motor 118. The rotational speed of the main motor 118 is detected by the FG signal.

The next description will explain the details of the phase switcher 234. As shown in FIG. 8, the scanner motor 25 is provided with three Hall elements 256. The Hall element 256 produces an output signal corresponding to the position of the rotor of the scanner motor 25. The output signal from the Hall element 256 is received by the motor driver 250*a*. The output signal from the Hall element 256 is amplified by a Hall element signal amplifier 271*a* (see FIG. 7) in the motor driver 250*a*, and is then converted into a digital signal by an A/D converter (not shown). The digitized Hall element signal is received by the ASIC 200.

The motor driver 250*a* includes the Hall element signal amplifier 271*a* and a coil driver 273*a*. The motor driver 250*b* includes the Hall element signal amplifier (not shown) and a coil driver (not shown). A power supply 274 is electrically connected to both motor drivers 250a and 250b.

The Hall element signal has a waveform that specifies the position of the rotor of the scanner motor 25. The ASIC 200 determines the position of the rotor, i.e., the relative position of the rotor with respect to the stator, when receiving the Hall element signal. It should be noted that the Hall element signal can be used as the FG signal. In other words, the rotational speed of the scanner motor 25 can be detected from the Hall element signal.

The ASIC 200 identifies the position of the rotor based on the input Hall element signal and then determines the phase-switching timing of the scanner motor 25. The ASIC 200 produces a digital signal corresponding to the determined phase-switching timing to the motor driver 250a. The next description will explain the functions of the phase switcher 234 to determine the phase-switching timing.

In this embodiment, the scanner motor 25 is a three-phase motor which has a U coil, a V coil, and a W coil star-connected. The Hall elements 256 (FIG. 8) are disposed at a regular intervals (such as every 120°) around the rotor of the scanner motor 25. Each Hall element supplies the Hall element signal to the ASIC 200.

Figure 9:
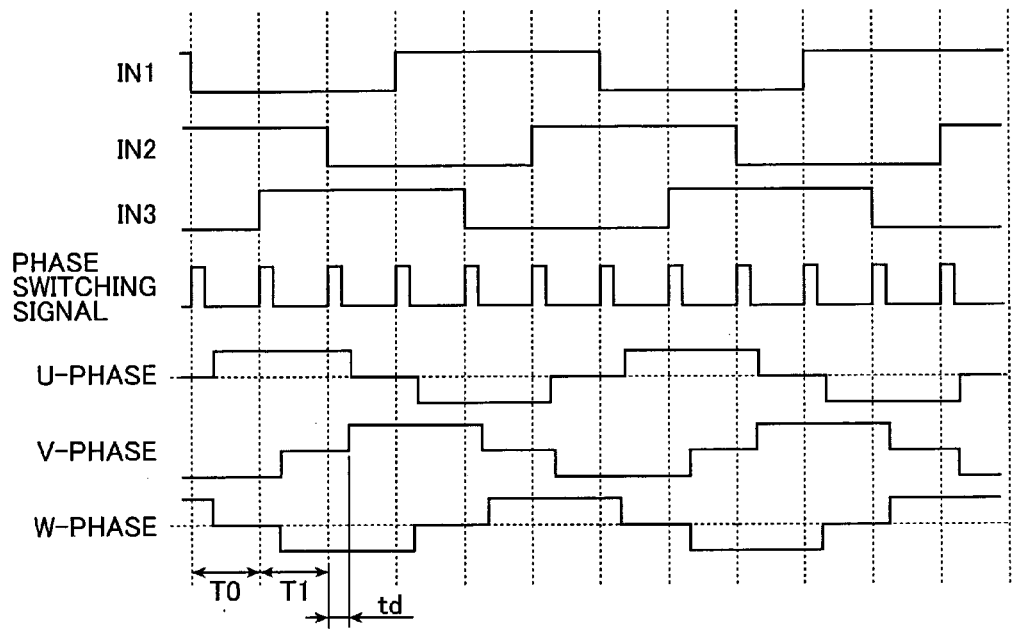
FIG. 9 is a timing chart illustrating Hall element signals, phase switching signals, and three phases of power supply applied to motor.

Referring to FIG. 9, when a leading edge or a trailing edge of the Hall element signal is detected, the phase switcher 234 produces a phase-switching signal to select two of the three coils and energize the selected coils in opposite polarities to each other. In this embodiment, when the phase switcher 234 detects a trailing edge of a Hall element signal IN1, the phase switcher 234 produces a phase-switching signal that turn the U phase positive, the V phase negative, and the W phase zero. The coil driver 273a of the motor driver 250a for feeding a coil current to the U coil, the V coil, and the W coil switches the phases of three-phase current in accordance with the phase-switching signal.

When the coil current is supplied to the motor, the rotor rotates through the predetermined angle. When another Hall element detects the rotor, the Hall element signal from the another Hall element is transferred to the ASIC 200. Simultaneously, the phase switcher 234 produces a phase-switching signal. Referring to FIG. 9, after the trailing edge of the Hall element signal IN1 is detected, a leading edge of a Hall element signal IN3 is detected. In response to the detection, the phase switcher 234 produces a phase-switching signal to turn the U phase positive, the W phase negative, and the V phase zero. Sequentially, when the trailing edge of a Hall element signal IN2 is detected, the phase switcher 234 produces another phase-switching signal to turn the V phase positive, the W phase negative, and the U phase zero. In this manner, the phase switcher 234 transfers the phase-switching signals in sequence to the motor driver 250a so that the coil driver 273a of the motor driver 250a (FIG. 7) performs the switching operations.

The next description will be made for explaining the operation of the motor drive device 190.

Referring to FIG. 9, when the ASIC 200 detects the Hall element signal, the ASIC 200 generates a phase-switching signal to the motor driver 250a. In response to the phase-switching signal, the motor driver 250a switches polarization of the motor. A time delay inherent in the characteristics of the Hall elements and motor driver occurs during the time period between the detection of the switching of the Hall element signal and the actual phase switching of the motor. A time delay of "td" is generated between the detection of the trailing edge of IN2 and the leading edge of the V phase.

The motor drive device 190 operates in order to compensate for the time delay "td." In the motor drive device 190, the CPU 230 controls the operation of the ASIC 200. The phase switcher 234 produces a correction signal to compensate for the delay in order to prevent the time lag between the detecting timing of the trailing edge of the Hall element signal and the actual timing of the phase-switching. The correction signal is produced the prescribed time "td" before the predetermined timing of the detection of the Hall element signal, so that the phases are switched in response to the correction signal. The prescribed time "td" is a time delay inherent to the characteristics of the Hall elements and the motor drivers. As described above, the time delay "td" occurs between the output timing of the phase switcher 234 and the switching timing of the phases. Therefore, the motor drive device produces the correction signal at the time td before the actual switching timing of the phases, so that the phases of the motor is switched precisely at the moment of the detection of the Hall element signal.

Figure 10:
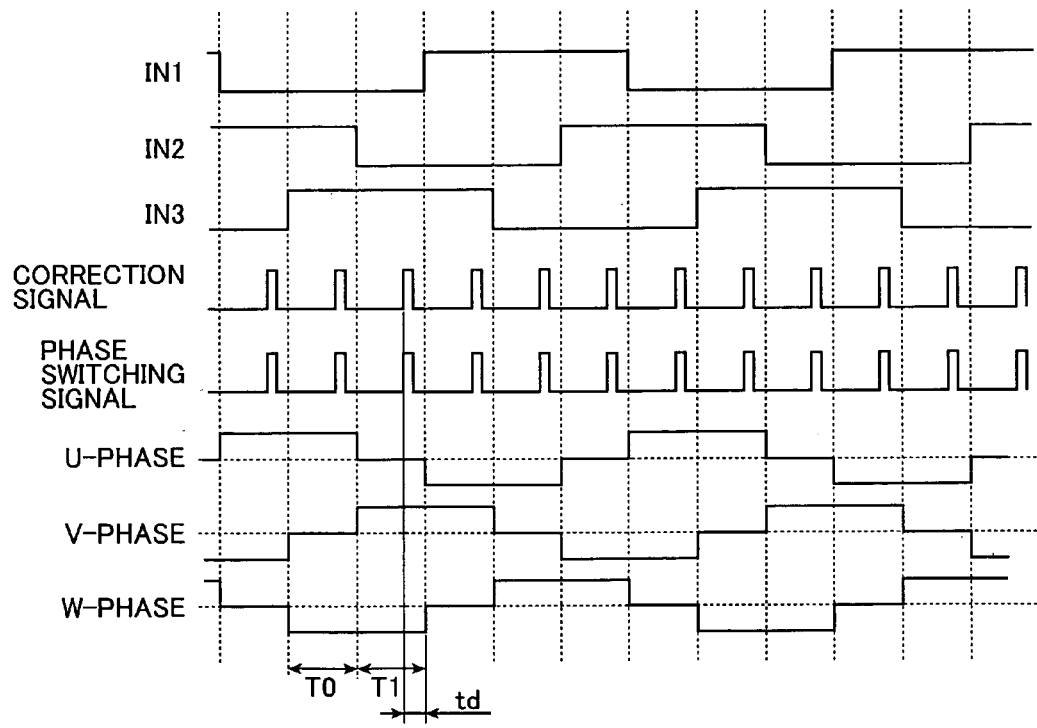
FIG. 10 is a timing chart illustrating Hall element signals, correction signals, phase switching signals, and three phases of power supply applied to motor.

Generally, rapid change in the rotating speed of the motor due to the load and the inertia thereof rarely happens. Referring to FIG. 10, the time length of a period T0 between the rise of the Hall element signal IN3 to the fall of the Hall element signal IN2 is considered substantially equal to the time length of the next time period T1 between the fall of the Hall element signal IN2 and the rise of the Hall element signal IN1. Thus the correction signal for the phase switching is produced at the time td before the predetermined timing of the detection of the rise of the Hall element signal IN1, to ensure that the actual phase switching occurs at substantially the same timing as the rise of the Hall element signal IN1. The timing of the detection of the rise of the Hall element signal IN1 is considered to be substantially the time T0 after the detection of the fall of the Hall element signal IN2. Therefore, the phase-switching is performed at substantially the same timing as the rise of the Hall element signal IN1 when the correction signal is produced at a time (T0−td) after the detection of the fall of IN2.

Note that if the rotational speed of the motor is fast, the proportion of td with respect to the period T1 is large. Therefore, the effect of the correction is large. If the rotational speed of the motor is low, in other words, it is assumed that T0−Td>T1 (the detection of the Hall element signal occurs before the output timing of the correction signal). In this case, the phase-switching signals is produced on condition that the Hall element signal is detected without waiting for the output of the correction signal.

Returning to FIGS. 7 and 8, the description now turns to the feedback controller 201. The ASIC 200 has a feedback controller 201a for scanner motor 25 and a feedback controller 201b for the main motor 118. Both of the feedback controller 201a and 201b have substantially the same configuration to calculate control quantities (speed instruction values) F1 and F2 for the motors, respectively. In this embodiment, the description concerns the feedback controller 201a for the scanner motor 25, with reference to FIG. 8.

As shown in FIG. 8, the feedback controller 201 includes a gain switcher 206, a gain switching controller 218, and the feedback calculation processor 202. The gain switching controller 218 generates switching instructions based on predetermined setting conditions to a gain switcher 210. The gain switcher 206 selects the gain corresponding to each switching instruction from gain setters 204a, 204b, 204c, and 204d. The gain setters 204a, 204b, 204c, and 204d hold a gain setting value in a selectable manner. The gain switcher 206 selects one of the settings held in these gain setters. The gain switcher 206 selects one of four gains. However, the number of gains is not limited to four, but may be two, three, five, or even more.

The gain switching controller 218 generates a selection instruction to select one gain for the gain switcher 206, based on the rotational state of the scanner motor 25. More specifically, when the scanner motor 25 starts rotating from a halted state, an instruction to select a startup gain is generated until the rotation of the motor reaches a steady operating state. Once reaching the steady operating state, another instruction to select another gain for steady operation, which is different from the startup gain, is selected. The CPU 230 determines that the motor reaches the predetermined steady operating state based on whether the motor rotates at a predetermined reference rotational speed Na. The instruction to select the startup gain is sent to the gain switcher until the motor comes to rotating at the reference speed Na from the halt state. When the rotation speed of the motor reaches the predetermined reference speed Na, an instruction to select a steady gain is generated. Note that a proportional gain and an integral gain are used in the calculation of the control quantity (speed instruction value). A startup proportional gain (the gain of gain setter 1) and an integral gain (the gain of gain setter 2) are selected as the startup gain. A steady proportional gain (the gain of gain setter 3) and an integral gain (the gain of gain setter 4) are selected as the steady gain. Thus the gain selected by the gain switcher 206 is used in the calculation of the control quantity (speed instruction value) in the feedback calculation processor 202.

In another embodiment, the determination as to whether the steady operating state has been reached, is made based on whether a predetermined reference time has elapsed from the start of rotation of the motor. The switching of the gain is made based on whether the predetermined reference time has elapsed since the start of the rotation of the motor. In this case, the startup gain is selected until the reference time has elapsed after the start of rotation of the motor. The ordinary operation gain is selected after the reference time has elapsed.

Figure 11:
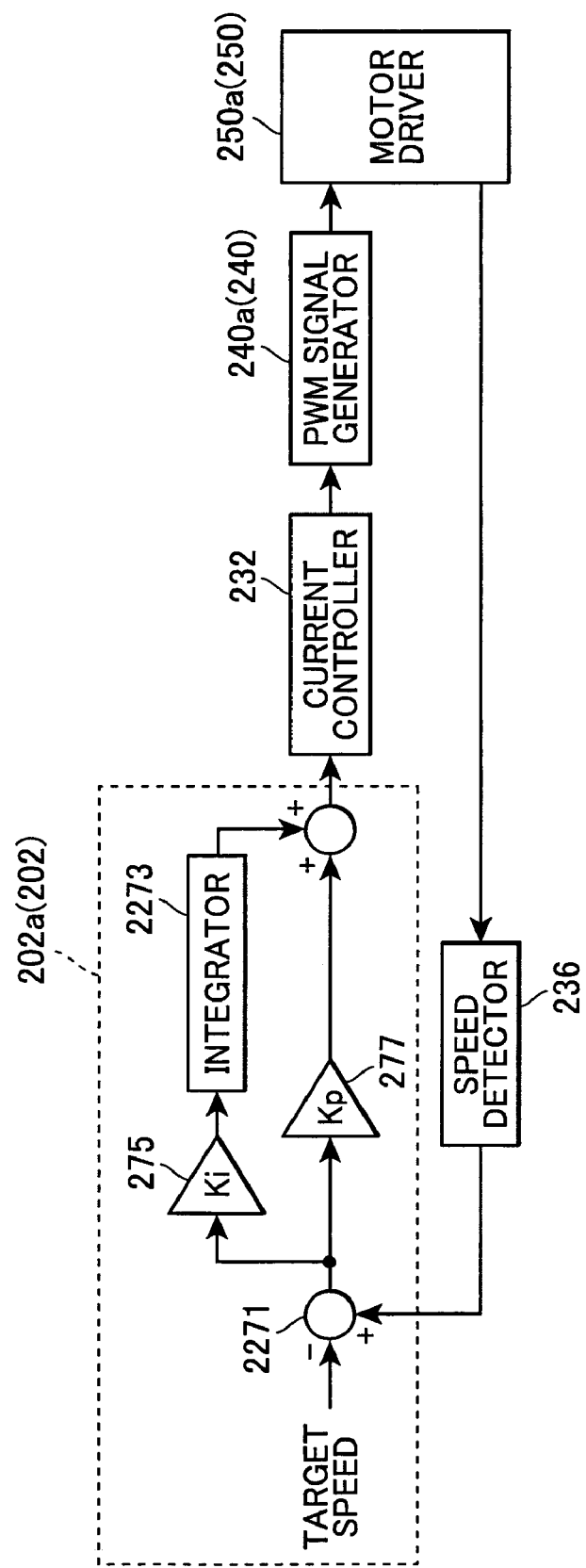
FIG. 11 is illustrative of the internal configuration and connection portions of the feedback controller.

Referring to FIG. 11, the feedback calculation processor 202 determines a control quantity (speed instruction value) of the scanner motor 25 based on the gain selected by the gain switcher 206 and the current rotational speed of the scanner motor 25 detected by the speed detector 236. In this embodiment, the feedback calculation processor 202 includes a subtractor 2271, a integral calculator 275, and an integrator 2273. The subtractor 2271 obtains the speed deviation between the current rotational speed and the target speed of the motor. The integral calculator 275 multiplies the integral gain by the speed deviation. The integrator 2273 obtains an integral of each value calculated by the integral calculator 275, to calculate an integral control value. The feedback calculation processor 202 has a proportional calculator 277 to multiply the speed deviation by a proportional gain to calculate a proportional control value. The feedback calculation processor 202 calculates the control quantity (speed instruction value) as the sum of the integral control value and the proportional control value. The control quantity (speed instruction value) is sent to a current controller 232. The proportional gain for startup, the proportional gain for steady operation, the integral gain for startup, and the integral gain for ordinary operation selected by the gain switcher 206 are used as the proportional gain used by the proportional calculator 277 and the integral gain used by the integral calculator 275 depending on the situation.

The thus-calculated control quantity (speed instruction value) is sent to the current controller 232, and sent to the PWM signal generator 240. A PWM signal generator 240a generates the PWM signal based on the speed instruction value or the PWM signal based on the speed instruction value by the current controller 232 to send the resultant signal to the motor driver 250a.

The description now turns to the current restrainer and the PWM signal generator.

In this embodiment, a first maximum permissible current used for driving the scanner motor 25 is set as A1. A second maximum permissible current used for driving the main motor 118 is set as B1. A sum of the first maximum permissible current A1 and the second maximum permissible current B1 is set as C. A maximum permissible supply current from the power supply 274 is set as D. The power supply 274 is selected so that the maximum permissible supply current D is less than C. However, even if the maximum permissible supply current D is less than the sum of (A1+B1), the power supply is sufficient to drive the motors 25 and 118 in a proper manner.

To enable the current setting as described above, the ASIC 200 has the current controller 232. If actual current values being supplied to the scanner motor 25 and the main motor 118 are set as A2 and B2, respectively, the current controller 232 controls the supply currents to ensure that a current value obtained by adding A2 and B2 is less than or equal to the maximum permissible supply current D. More specifically, the current controller 232 controls the speed instruction value to be supplied to each of the PWM signal generators. The control by the current controller 232 is such that the current value B2 supplied to the main motor 118 remains to be less than the second maximum permissible current B1.

As shown in FIG. 12(a), the current controller 232 controls the current value (speed instruction value) for driving the scanner motor 25 and the current value (speed instruction value) for driving the main motor 118 based on settings for each condition. If Condition 1 is satisfied, the current values Ia1 and Ib1 for the Condition 1 are supplied to each PWM signal generator 240a and 240b. The PWM signal generators 240a and 240b then generate PWM signals corresponding to the current values. Similarly, if condition 2 is satisfied, corresponding current values Ia2 and Ib2 are generated. As describe above, the current value (speed instruction value) is allocated to each motor.

Referring to FIG. 12(b), when the scanner motor 25 starts rotating from the halt state, in other words, a total current value E of the current value A2 supplied to the scanner motor 25 and the current value B2 supplied to the main motor 118 is controlled to be less than the maximum permissible supply current D. And, at least the current value B2 is controlled to be less than the second maximum permissible current B1. More specifically, the current values to the motors is controlled such that $A2/A1 > B2/B1$.

Figure 13A:
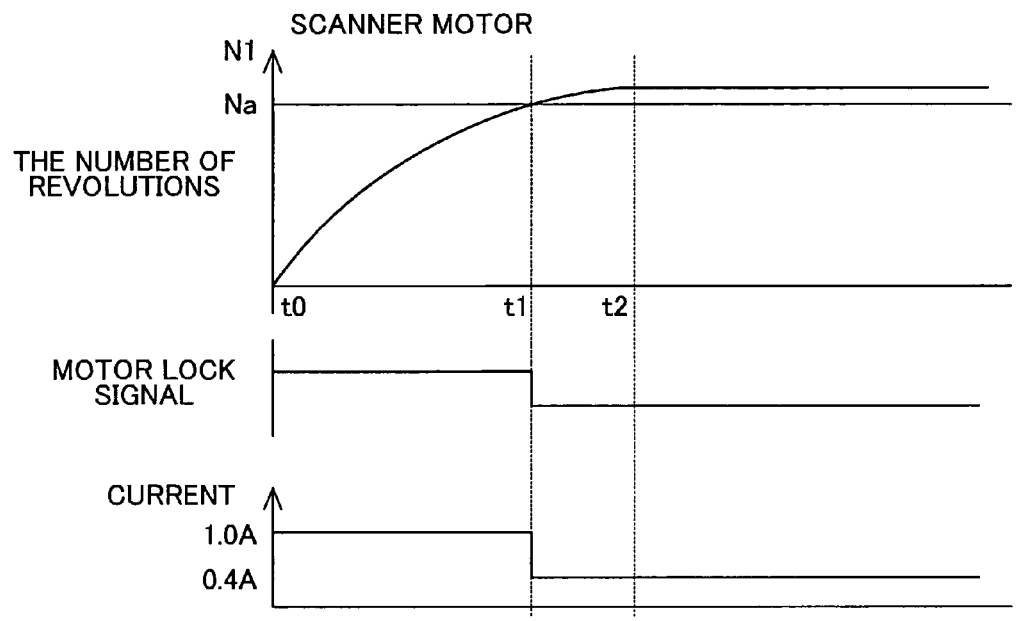
FIGS. 13(*a*) and 13(*b*) show examples of the driving of the scanner motor and the main motor.
Figure 13B:
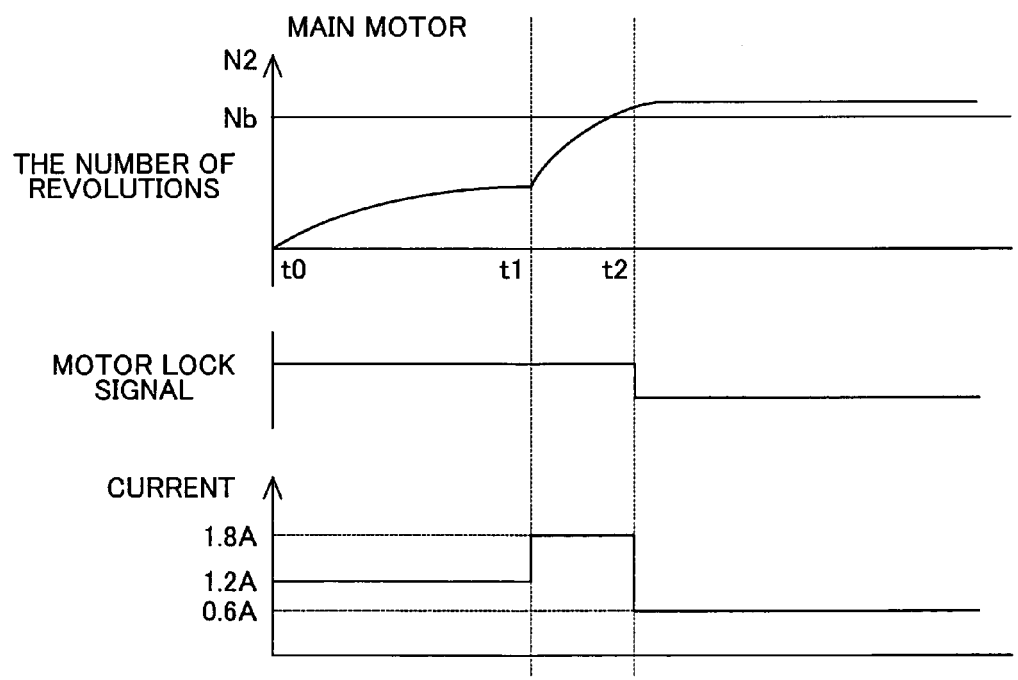

In this embodiment, the driving of the scanner motor 25 (of FIG. 7) is given priority to ensure that the first maximum permissible current A1 is supplied to the scanner motor 25 until the scanner motor 25 rotates at a constant speed after the scanner motor 25 starts rotating. More specifically, the current controller 232 sets a speed instruction value corresponding to the first maximum permissible current A1 (1.0 A in FIG. 12(b)) for the scanner motor 25 during a time period from the starting time t0 to the time t1 at which a rotational speed N1 of the scanner motor 25 reaches the reference rotational speed Na. The reference rotational speed Na is set as the reference speed for the steady operating state, as shown in FIG. 13. The speed instruction value for the main motor 118 is set in such a manner that the current value subtracted the current value A2 from the maximum permissible supply current D is supplied to the scanner motor 25. As described above, the current flow to the scanner motor 25 is first set, and the current flow to the main motor 118 is then set within the range of the maximum permissible supply current D.

In this embodiment, the power supply 274 has a power capacity to supply current flow of 2.2 A at the maximum. Referring to FIG. 13, the current settings for each motor are shown. When A1 is 1.0 A and the maximum 1.0 A current is supplied to the scanner motor 25 during the time period from t0 through t1, the current controller 232 determines that a current flow within the range of a maximum of 1.2 A is supplied to the main motor 118. In other words, the current value of the main motor 118 during that time period of t0-t1 is within the range of (D-A2), as shown in FIG. 12(b). Accordingly, a current of (D-A1) i.e., 1.2 A is supplied to the main motor 118, as shown in FIG. 13. Note that the reference rotational speeds Na and Nb are set to be 90% of the corresponding target speeds. As an example, if the target speed of the scanner motor 25 is 30,000 ppm, the reference rotational speed Na is approximately 27,000 ppm. If the target speed of the main motor 118 is 3000 ppm, the reference rotational speed Nb is 2700 ppm.

FIG. 13 also shows the relationship between elapsed time since the start of motor drive and rotational speed of the motor, and also the timing of a motor lock signal. In this embodiment, the motor lock signal is generated at the timing at which the reference rotational speeds Na and Nb reach the rotational speeds N1 and N2 of the motors, respectively.

Once the rotation of the scanner motor 25 has reached the steady operating state after starting the rotation from the halted state (in other words, when the rotational speed N1 has reached the reference rotational speed Na), the current controller 232 changes the current value supplied to the scanner motor 25 to be less than 1.0 A at the start of rotation. As shown in FIG. 12(b), the current value B2 supplied to the main motor 118 is controlled to be increased after the time t1. In other words, the current controller 232 supplies the maximum permissible current B1 to the main motor 118. After the time t1, the scanner motor 25 does not require the maximum current because the scanner motor 25 is in the steady operating state. Therefore, a current within the remaining current range. i.e., the range of (D-B2) is supplied to the scanner motor 25. More specifically, a maximum current of 1.8 A corresponding to the maximum permissible current B1 is supplied to the main motor 118 within the time period from the time t1 through the time t2. Accordingly, a current of 0.4 A is supplied to the scanner motor 25, as shown in FIG. 13. In other words, a current flow of (D-B1), i.e., 0.4 A is supplied to the scanner motor 25.

Moreover, when the rotations of both the scanner motor 25 and the main motor 118 have reached the steady operating state, the current flow A2 supplied to the scanner motor 25 is decreased to a maximum A3 (where A3<A1). Simultaneously, the current flow B2 being supplied to the main motor 118 is decreased to B3 (where B3<B1), as shown in FIG. 12(b). It should be noted that in FIG. 12(b), (A2+B2) are less than or equal to 2.2, regardless of rotating states of the motors. It should be noted that the sum of maximum currents A1 and B1 is more than 2.2 A. Accordingly, D is set to be more than 2.2 A.

As described above, the current controller 232 sets control quantities (speed instruction values) representing current flows for the motors 25 and 118 and transfers the control quantities to the PWM signal generators 240a and 240b. The PWM signal generators 240a and 240b generate a first PWM signal for the scanner motor 25 and a second PWM signal for the main motor 118. The PWM signal generators 240a and 240b then modulate the pulse widths of the first and second PWM signals, based on the speed instruction values supplied from the current controller 232.

The current controller 232 of FIG. 8 sets a control quantity (speed instruction value) for each motor based on the control quantity (speed instruction value) calculated by the feedback calculation processor 202. The feedback calculation processor 202 operates based on the rotational speed of the motor detected by the speed detector 236. The above control quantities (speed instruction values) are the pulse width of the first PWM signal produced in the PWM signal generator 240a and the pulse width of the second PWM signal produced in the PWM signal generator 240b. The current values to be supplied to each motor can be assumed from these pulse width instruction values. If the current controller 232 determines each of current values for the motors in order that the sum of the assumed current values is less than or equal to the maximum permissible supply current D, it is possible to allocate suitable values without detecting the actual supplied current to the motors.

In this manner, the currents supplied to the scanner motor 25 and the main motor 118 are controlled based on the detected rotational speed by the speed detector 236.

The next description will be made for explaining another control method of the motors, referring to FIGS. 14 and 15. In this embodiment, A2 and B2 are set as the current values supplied to the scanner motor 25 and the main motor 118, respectively. The ROM 260 and RAM 262 are used for storing the settings as shown in FIG. 14. It should be noted that the above settings can be modified.

Figure 15:
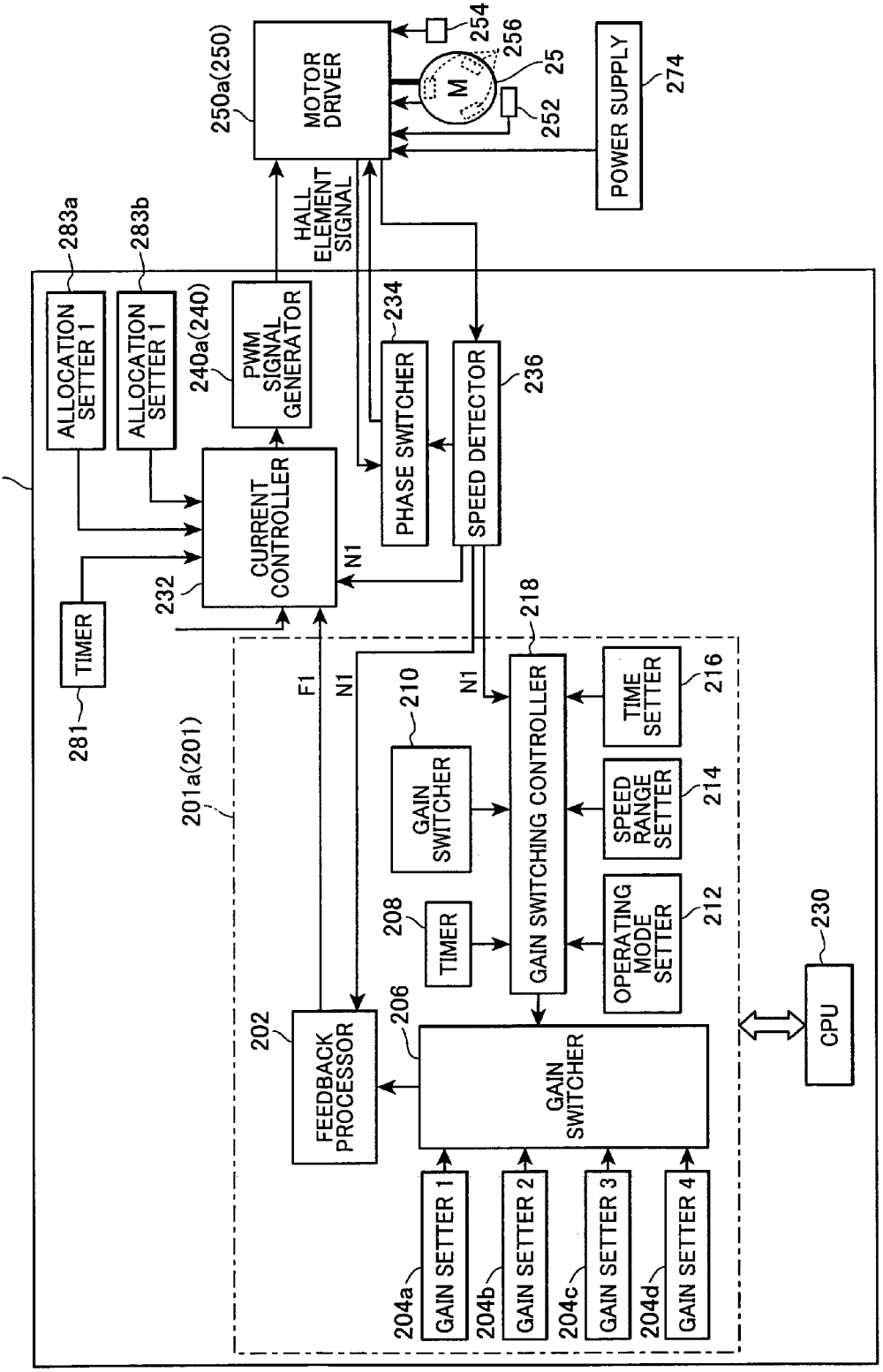
FIG. 15 is a block diagram showing the current controller and linkage portions.
Figure 16:
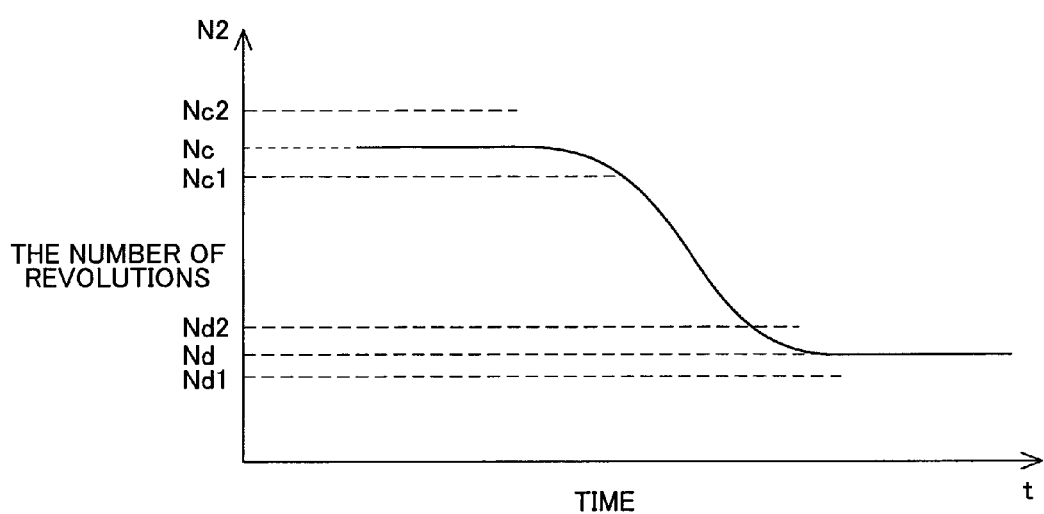
FIG. 16 shows an example of driving the main motor.

In the configuration shown in FIG. 15, a timer 281 and allocation setters 283a and 283b are connected to the current controller 232. A setting value that specifies the allocation setter being used is stored in memory provided in the allocation setters 283a and 283b. The allocation setter 283a stores setting data as shown in FIG. 14(a). The allocation setter 283b stores setting data as shown in FIG. 14(b). The current controller 232 selects one of setting data depending on conditions.

More specifically, the timer 281 measures the elapsed time after the scanner motor 25 starts rotating. The setting value is changed as a function of the measured time. In other words, the motor drive device 190 determines whether the time period required for the scanner motor 25 to reach the steady operating state from the startup (the time period: t1-t2) exceeds a predetermined reference time period ta. If the time period from t1 to t2 is less than or equal to the reference time ta, the setting data shown in FIG. 14(a), i.e., current values for the motors 25 and 118 is used in order to activate both motors 25 and 118. If the time period t1-t2 is longer than the reference time period ta, the setting data shown in FIG. 14(b), i.e., current values for the motors 25 and 118 is used in order to activate both motors 25 and 118. If a longer time period is required for the startup of the motors 25 and 118 due to the secular deterioration, the allocations of the current flow to each motor is changed. For example, as shown in FIG. 14(b), the current flow for the scanner motor 25 is set to be more than that shown in FIG. 14(a). A maximum current of 1.2 A is supplied to the motor 25 until the motor 25 reaches the steady operating state from the startup. On the other hand, the current flow to the main motor 118 is decreased than that shown in FIG. 14(a). Accordingly, the sum of the current flows to the motors 25 and 118 does not exceed the maximum permissible supply current D from the power supply 274.

The following embodiment shows the method of switching between different gains. The main motor 118 rotates at one of at least two different speeds: a first speed and a second speed. The gain switcher 206 and the gain switching controller 218 select a speed modification gain, when the main motor 118 is rotating at a first rotational speed Nc and the main motor 118 is required to change the rotation speed from the first speed Nc to a second speed Nd. In this embodiment, an operating mode setter 212 stores an operating mode, i.e., the requirements which trigger the gain switching. If the operation mode is satisfied, the motor drive device 190 switches the gain. After the speed of the main motor 118 is changed from the first speed Nc to the second speed Nd, and the second speed conditions for the second speed Nd is satisfied, a fixed-speed operation gain is selected.

More specifically, when the speed of the main motor 118 is changed from the first speed Nc to the second speed Nd, the speed modification gain is selected in response to the instruction for changing the speed. Subsequently, when the rotation speed N2 of the main motor 118 has entered within a predetermined reference speed range from Nd1 to Nd2 based on the second speed Nd, a fixed-speed operation gain is selected.

Alternatively, the fixed-speed operation gain can be selected when a predetermined time period has elapsed after the speed change of the motor 118 from the first speed Nc to the second speed Nd is instructed. In this case, the timer 208 shown in FIG. 8 is used to measure the elapsed time. And the motor drive device 190 determines whether the reference time period, the predetermined time period, set by the time setter 216 is elapsed.

The fixed-speed operation gain can be selected when the main motor 118 is rotating at a fixed-speed. And a second gain different from the fixed-speed operation gain can be selected when the main motor 118 is rotating at a different speed from a predetermined target speed for fixed-speed operation. For example, the fixed-speed operation gain is selected when the main motor 118 is operating at the rotational speed Nc. The second gain different from the fixed-speed operation gain is selected when the main motor 118 is rotating at a different speed from the predetermined target rotational speed range (Nc1-Nc2) for fixed-speed operation. In this case, a speed range setter 214 of FIG. 8 stores the rotational speed range. The motor drive device 190 determines whether the rotational speed of the main motor 118 is out of the speed range.

The present invention can be applied a copy machine or a facsimile machine including an image formation function.

The rotation speed of the motor can be detected based on a rotational position signal that specifies the rotational position of the brushless DC motor. For example, rotational speed information can be generated based on the Hall element signal. In this case, the FG signal generator 252 and the BD sensor 254 can be omitted.

The motor drive device 190 can drive more than two motors. For example, a plurality of scanner motors are provided for each color, when the printer is a color laser printer.

What is claimed is:

1. A motor drive device comprising:
    a motor drive unit that drives a brushless DC motor, the brushless DC motor comprising a rotor;
    a controller that produces a motor driving signal to drive the brushless DC motor; and
    a rotational detector that detects a rotational state of the brushless DC motor to produce a rotational state signal,
    wherein the controller receives the rotational state signal from the rotational detector,
    wherein the controller has a phase switcher that determines a phase-switching timing to switch a phase of the brushless DC motor based on the rotational state signal, the phase switcher being a separate unit from the motor drive unit, wherein the controller transmits the phase-switching timing as the motor driving signal to the motor drive unit, and
    wherein the controller is affixed to a circuit board that is different from another circuit board to which the motor drive unit is affixed.

2. The motor drive device according to claim 1, wherein the rotational detector comprises a rotational angle detector that detects an angular position of the rotor to generate an angular position signal thereof, and
    the controller determines the phase-switching timing based on the angular position signal.

3. The motor drive device according to claim 2, wherein the rotational angle detector comprises a Hall element, and
    the controller determines the phase-switching timing based on an output signal from the Hall element.

4. The motor drive device according to claim 1, wherein the rotational detector comprises a rotational frequency detector that detects a rotational frequency of the brushless DC motor,
    the controller receives an output signal from the rotational frequency detector, determines a rotational speed of the brushless DC motor based on the output signal, and transmits the rotational speed as the motor driving signal to the motor drive unit.

5. The motor drive device according to claim 1, wherein the brushless DC motor rotates a polygon mirror to reflect a laser beam from a laser beam generator,
    the rotational detector comprises a beam detector sensor that detects the laser beam reflected from the polygon mirror, and
    the controller receives an output signal from the beam detector sensor as the rotational state signal, determines a rotational speed of the brushless DC motor based on the output signal, and transmits the rotational speed as the motor driving signal to the motor drive unit.

6. The motor drive device according to claim 5, wherein the rotational detector comprises:
    a rotational angle detector that detects an angular position of the rotor to generate an angular position signal thereof; and
    a rotational frequency detector that detects a rotational frequency of the brushless DC motor to generate a frequency signal, wherein the controller:
    receives the angular position signal and the frequency signal as the rotational state signal,
    the controller determines a rotational speed of the brushless DC motor based on at least one of the angular position signal and the frequency signal when the rotational speed of the brushless DC motor is less than or equal to a predetermined constant speed,
    determines a rotational speed of the brushless DC motor based on the output signal of the beam detector sensor when the rotational speed of the brushless DC motor exceeds the predetermined constant speed, and
    transmits the determined rotational speed to the motor drive unit as motor driving signal.

7. The motor drive device according to claim 1, wherein the controller determines the phase-switching timing, based on a delay of the motor drive unit that is inherent in a rotational speed of the brushless DC motor.

8. The motor drive device according to claim 1, wherein the controller comprises:
    gain setting unit that sets a plurality of gains; and
    gain selection unit that selects one among the plurality of gains, based on the rotational state of the brushless DC motor, wherein the controller determines a rotational speed of the brushless DC motor based on the selected gain and the rotational state signal, and transmit the rotational speed as the motor driving signal to the motor drive unit.

9. The motor drive device according to claim 1, wherein the motor drive device is part of an image forming device.

10. The motor drive device according to claim 1, wherein the controller with the phase switcher being part of an ASIC.

11. A motor drive device comprising:
a motor drive unit that drives a brushless DC motor;
a controller that produces a motor driving signal to drive the brushless DC motor;
a rotational detector that detects a rotational state of the brushless DC motor to produce a rotational state signal;
a gain setting unit that sets a plurality of gains; and
a gain selection unit that selects one among the plurality of gains, wherein
the controller determines a rotational speed of the brushless DC motor based on the selected gain and the rotational state signal, and transmit the rotational speed as the motor driving signal to the motor drive unit.

12. The motor drive device according to claim 11, wherein the gain selection unit:
selects a startup gain from a startup of rotation of the brushless DC motor until rotation of the brushless DC motor at a predetermined constant speed; and
selects a constant speed gain different from the startup gain when the brushless DC motor rotates at the predetermined constant speed.

13. The motor drive device according to claim 11, wherein the gain selection unit:
selects a speed modification gain when the rotational speed of the brushless DC motor changes from a first constant speed to a second speed after rotating at the first constant speed; and
selects a constant speed operation gain after the rotational speed has been changed from the first constant speed to the second speed.

14. The motor drive device according to claim 11, wherein the gain selection unit:
selects a constant speed gain when the brushless DC motor rotates at a constant speed; and
selects a second gain different from the constant speed gain when the rotational speed of the brushless DC motor is out of a predetermined rotational speed range based on a target speed.

15. The motor drive device according to claim 11, wherein the controller comprises a phase switcher that determines a phase-switching timing to switch a phase of the brushless DC motor, the phase switcher being a separate unit from the motor drive unit.

16. The motor drive device according to claim 15, wherein the motor drive unit resides on a first circuit board, the controller with the phase switcher resides on a second circuit board, the second circuit board being separate and different from the first circuit board, the controller with the phase switcher being part of an ASIC.

* * * * *